(12) United States Patent
Womac et al.

(10) Patent No.: US 10,778,099 B1
(45) Date of Patent: Sep. 15, 2020

(54) BOOST-BACK PROTECTION FOR POWER CONVERTER

(71) Applicant: Texas Instruments Incorporated, Dallas, TX (US)

(72) Inventors: Austin James Womac, Knoxville, TN (US); Siew Kuok Hoon, Plano, TX (US); Orlando Lazaro, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/520,015

(22) Filed: Jul. 23, 2019

(51) Int. Cl.
*H02M 3/158* (2006.01)
*H02M 1/14* (2006.01)
*H02J 7/00* (2006.01)
*H02M 3/156* (2006.01)

(52) U.S. Cl.
CPC ............ *H02M 3/1582* (2013.01); *H02J 7/00* (2013.01); *H02M 1/143* (2013.01); *H02J 2207/20* (2020.01); *H02M 2003/1566* (2013.01)

(58) Field of Classification Search
CPC .............. H02M 3/1582; H02M 1/143; H02M 2003/1566; H02M 1/32; H02J 7/00; H02J 2207/20
See application file for complete search history.

(56) References Cited

U.S. PATENT DOCUMENTS

| 6,717,826 | B2 | 4/2004 | Noon et al. |
| 8,884,598 | B2 | 11/2014 | Harrison |
| 9,484,799 | B2* | 11/2016 | Zhang .................. H02M 3/158 |
| 9,559,538 | B1* | 1/2017 | Bonte ...................... H02J 7/00 |
| 10,177,420 | B2* | 1/2019 | Huang ................. H02J 7/0091 |
| 2007/0052395 | A1* | 3/2007 | Belch ................. H02M 3/1582 323/222 |
| 2015/0162831 | A1* | 6/2015 | Ladret ................... H02M 3/156 307/23 |
| 2015/0229215 | A1 | 8/2015 | Choudhary |
| 2018/0294726 | A1 | 10/2018 | Priego et al. |
| 2019/0252896 | A1* | 8/2019 | Huang ...................... H02J 7/00 |
| 2019/0305568 | A1* | 10/2019 | Hand ...................... H02J 7/007 |
| 2019/0379288 | A1* | 12/2019 | Chaput ............ H02M 3/33576 |

\* cited by examiner

*Primary Examiner* — Kyle J Moody
(74) *Attorney, Agent, or Firm* — Mark Allen Valetti; Charles A. Brill; Frank D. Cimino

(57) ABSTRACT

A device includes a power converter having an input coupled to a first node and an output coupled to an output terminal adapted to couple to a battery. A blocking transistor is coupled between a second node and the first node. A regulator has inputs coupled to the first node and the second node and an output coupled to a control node of the blocking transistor. The regulator is configured to control the blocking transistor to regulate a voltage drop across the blocking transistor based on a voltage between the first node and the second node. The regulator is also configured to turn off the blocking transistor in response to a voltage at the first node exceeding a voltage at the second node by at least a threshold to block boost-back current flowing from the output terminal to the second node.

20 Claims, 7 Drawing Sheets

BOOST-BACK PROTECTION FOR POWER CONVERTER

TECHNICAL FIELD

This relates generally to electronic circuitry, and more particularly to reducing boost-back in a power converter.

BACKGROUND

Various types of power converters can be designed to convert a source of direct current from one voltage level to another voltage level. As an example, a buck converter is a class of switched-mode power supply that typically includes transistors configured to step down an input voltage to provide a corresponding output voltage to one or more storage elements, such as including a capacitor and/or an inductor. A common application for a buck converter is battery charger. For example, the battery charger is configured to put energy into a battery by forcing an electric current through the battery. When in normal operation, a synchronous buck converter draws current from the input and pushes current out of the output. Forced continuous conduction mode (CCM) operation is desired in some applications for its frequency response and design simplicity. However, in this mode, a controller may request current in the reverse (negative) direction. Current in the negative direction is called boost-back and is generally undesired in a buck regulator.

By way of example, boost-back may be categorized into two general types: regulated boost-back and unregulated boost-back. A regulated boost-back condition occurs when the converter is able to request a negative current and find a stable regulation point. Unregulated boost-back occurs when the converter requests negative current but is unable to reach a stable operating point. This condition can cause uncontrolled voltage and/or current run-away on the input of the converter and may damage the device or other components in the system. The regulation loops in the converter most often responsible for unregulated boost-back are output voltage regulation and temperature regulation. For temperature regulation, if the ambient temperature exceeds the target junction temperature regulation point, then this regulation loop will drive the output current below zero and continue to drive the current lower (more negative). This condition is a positive feedback condition, which is undesirable, since the more negative current the converter drives out, the more heat the device dissipates.

SUMMARY

In a first example, a device includes a power converter having an input coupled to a first node and an output coupled to an output terminal adapted to couple to a battery. A blocking transistor is coupled between a second node and the first node. A regulator has inputs coupled to the first node and the second node and an output coupled to a control node of the blocking transistor. The regulator is configured to control the blocking transistor to regulate a voltage drop across the blocking transistor based on a voltage between the first node and the second node and to turn off the blocking transistor in response to a voltage at the first node exceeding a voltage at the second node by a threshold block boost-back current flowing from the output terminal to the second node.

In another example, a system includes a power converter configured to provide a charge current to an output terminal in response to one or more control signals and based on a voltage at a first node. A blocking transistor is coupled between a second node and an input node of the power converter. A regulator is configured to regulate a voltage drop across the blocking transistor based on a voltage at the first node and a voltage at the second node and configured to turn off the blocking transistor in response to a voltage at the first node exceeding a voltage at the second node by a threshold amount, such that current from the output terminal to the second node is blocked by the blocking transistor. An input detector is configured to discharge the second node in response to the blocking transistor being turned off. A boost-back detector is configured to turn off the power converter in response to detecting a boost-back condition of the power converter.

In yet another example, a method includes controlling a charge current to an output terminal that is adapted to couple to a battery based on a voltage at a first node and control signals. The method also includes regulating a voltage across a blocking transistor, which is coupled between a second node and the first node, based on a reference voltage. In response to detecting the voltage at the first node exceeds the voltage at the second node, the method also includes turning off the blocking transistor and discharging the second node.

DETAILED DESCRIPTION

Figure 1:
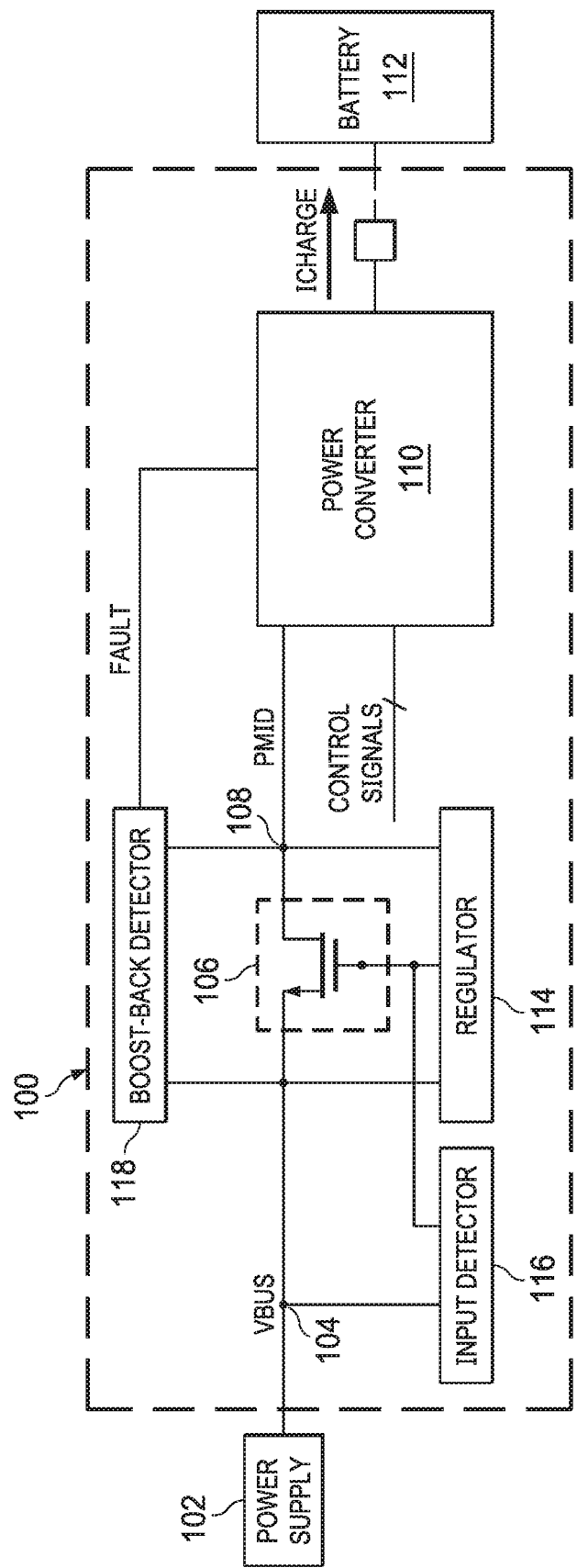
FIG. 1 is a diagram of an example of a system for charging a battery that includes boost-back protection.

This disclosure relates to systems and circuits for reducing boost-back in a power converter, such as a buck converter (e.g., a forced continuous conduction mode (CCM) buck converter). In examples disclosed herein, the systems and methods are described in the context of a power converter implemented within a battery charger; however, the systems and circuits disclosed herein can be used to reduce boost-back in other applications of power converters.

As an example, a power converter has an input coupled to a first node. A blocking transistor is coupled between the first node and a second node to which a power supply is coupled to provide an input voltage. A regulator is configured to regulate a voltage drop across the blocking transistor to control voltage and current provided to the input of the power converter at the first node. For example, the regulator is configured to control the blocking transistor and regulate the voltage across the blocking transistor based on a comparison of the input voltage from the power supply and the voltage at the input of the power converter. An input detector is configured to discharge the second node in response to detecting that the blocking transistor is turned off. A boost-back detector is configured to generate a fault signal based on the input voltage from the power supply and the voltage at the first node at the input of the power converter. For example, the power converter can be turned off in response to the fault signal and/or the first node can be discharged in response to the fault signal.

The blocking transistor enables the system to monitor and protect against boost-back that might occur when the voltage at the input of the power converter exceeds the input voltage from the power supply. The regulator further allows the blocking transistor to behave as an ideal diode, such as by regulating the voltage drop across the blocking transistor to be a small voltage (e.g., less than 100 mV, such as about 20 mV). This allows for higher total power efficiency than may be achieved with a pn-junction diode. For example, by implementing a regulator to control the blocking transistor in this manner, the regulator can quickly turn off the blocking transistor during boost-back, such as when the input voltage is removed (e.g., in response to an AC supply being unplugged or otherwise being disconnected). Additionally, because the boot-back protection is implemented at the supply input, in contrast to within a power stage of the power converter, the approach can be implemented without requiring additional circuitry to compensate for discontinuous conduction that tends to occur in power converters that control a low-side FET to reduce boost-back. For example, some existing designs turn off a low-side FET to reduce boost-back conditions. However, this may result in entering a discontinuous conduction mode and provide increased ripple in the output that involve increased complexity to reduce such undesired consequences and ensure stability of all regulation loops throughout its various operating modes.

FIG. 1 illustrates a block diagram of a system 100 that includes a power converter 110 for charging a battery 112. The system 100 is configured to reduce (or block) boost-back that may occur if the control signals dictate a negative ICHARGE current. As described herein, boost-back corresponds to a condition when reverse current flows from the output of a power converter (e.g., coupled to a battery terminal) that prevents undesired power delivery from the battery 112 to the system 100. In some examples, boost-back may occur when the battery voltage exceeds the input voltage at 104. In other examples, boost-back may occur when the battery voltage is less than the input voltage but is boosted to obtain power delivery in the negative direction.

In some examples, the system 100 is representative of a battery charger. The system 100 or portions thereof may be implemented as an integrated circuit (IC) chip, or a plurality of IC chips mounted on a circuit board operating in concert (e.g., as a multi-chip module). As one example, the system 100 is implemented on a mobile device, such as a smart phone, a notebook or laptop computer, an internet of things (IoT) device, etc. However, the system 100 is alternatively utilizable in any power converter system, such as a buck converter configured to charge the battery 112.

The system 100 includes a power supply 102 that generates a bus voltage, VBUS on a node, such as described herein as a bus voltage node 104. The bus voltage node 104 is representative of a voltage rail (or power bus) of the system 100. The bus voltage node 104 is coupled to provide the bus voltage VBUS to an input node (e.g., a source) of a blocking transistor 106.

For example, the blocking transistor 106 is implemented as a metal oxide semiconductor field effect transistor (MOSFET). In the example illustrated, the blocking transistor is demonstrated as an n-channel enhancement mode MOSFET (NMOS). However, in other examples, other types of transistors, such as P-channel enhancement mode MOSFETS (PMOSs) may be used as the blocking transistor 106. In yet other examples, a different type of transistor may be used, such as Group III-V transistor (e.g., as gallium nitride (GaN) transistor), isolated gate bipolar transistor (IGBT), bipolar junction transistor (BJT), and silicon carbide (SiC) transistor. The bus voltage node 104 is coupled to an input node (e.g., the source) of the blocking transistor 106. An output node (e.g., a drain) of the blocking transistor 106 is coupled to an input power node 108 of a power converter 110. In this example, the voltage at the input power node 108 is referred to as a converter input voltage (PMID).

The power converter 110 is configured to convert the input voltage PMID to provide a corresponding output voltage that provides a charge current, ICHARGE, at an output terminal. For example, the battery 112 can be configured to generate the charge current ICHARGE to charge the battery based on the converter input voltage, PMID, and control signals, CONTROL SIGNALS that are input into the power converter 110.

As an example, the CONTROL SIGNALS are varied based on data provided by external sources and/or sensors. The external sources and/or sensors that provide the control signals, CONTROL SIGNALS may include a temperature of the system 100, a temperature of the battery 112, input current to the battery 112, output current to the battery 112, input voltage to the battery 112, and output voltage to the battery 112. Other types of CONTROL SIGNALS can be provided as part of respective regulation loops for controlling the charging of the battery 112. A filter element (not shown) may be provided between the output of the power converter 110 and the battery 112 to reduce switching and other noise in the current signal that is provided to charge the battery.

A regulator 114 is coupled to the control node (e.g., the gate) of the blocking transistor 106. The regulator 114 is also coupled to the bus voltage node 104 and the input power node 108 of the power converter 110. The regulator 114 is configured to regulate the voltage across the blocking transistor 106. For example, the regulator 114 is configured to apply a control voltage to a control node (e.g., a gate) of the blocking transistor 106 to regulate the voltage across the blocking transistor 106, corresponding to a potential difference between the bus voltage VBUS at bus voltage node 104 and the converter input voltage PMID at the input power node 108. In an example, the regulator 114 is configured to regulate the voltage drop across blocking transistor 106 to a small voltage (e.g., less than 100 mV, such as 10 mV or 4 mV). The regulator 114 is also configured to turn off the blocking transistor 106 (e.g., operating in a cut-off region) in response to PMID exceeding VBUS by a voltage threshold, such that the blocking transistor blocks reverse current flow from the battery 112 to the bus voltage node 104 during a boost-back condition.

An input detector 116 is coupled to the bus voltage node 104 and the control node of the blocking transistor 106. The input detector 116 is configured to compare the bus voltage VBUS and the output of the regulator 114. The input detector 116 is further configured to discharge the bus voltage VBUS at the bus voltage node 104 when the blocking transistor 106 is turned off in response to the bus voltage VBUS exceeding the converter input voltage PMID by a threshold voltage. The threshold voltage may be a negative voltage or it may be positive. For example, the input detector 116 may include a switch device coupled between the bus voltage node and an electrically neutral (or lower potential) node such as electrical ground. The input detector 116 thus can activate the switch in response to detecting the blocking transistor is turned off.

An unregulated boost-back detector 118 includes inputs coupled to the bus voltage node 104 and the input power node 108. The unregulated boost-back detector 118 is configured to generate a fault signal FAULT based on the VBUS at the bus voltage node 104 exceeding a voltage at the input power node 108 by a threshold level. The fault signal can be applied to the power converter 110 in response to detecting an unregulated boost-back condition. The power converter 110 is configured to turn off (e.g., no longer provide ICHARGE to battery 112) in response to the FAULT signal. Additionally, the input power node 108 may be discharged in response to the FAULT signal. For example, a switch device coupled between the input power node 108 and electrical ground may be activated in response to the FAULT signal.

The power converter 110 is configured provide the charge current ICHARGE to the battery 112 by based on the converter input voltage PMID and CONTROL SIGNALS that are provided by external sources and/or sensors (e.g., temperature, voltage, and current sensors) to regulate the voltage at the output terminal as to prevent overcharging of the battery 112. The system 100 is further configured to apply a control voltage to the control node of the blocking transistor 106 based on the difference between the bus voltage VBUS and the converter input voltage, PMID. The blocking transistor 106 is turned off (e.g., operates in a cut-off region) if the bus voltage VBUS exceeds the converter input voltage PMID by a threshold to block reverse power flow from the battery 112, thereby preventing undesired discharge by the battery 112. The system 100 is further configured to shut off the power converter 110 to prevent unregulated boost-back that would otherwise cause uncontrolled voltages and currents in the power converter 110.

The system 100 exhibits improved boost-back protection over typical power converters. For example, by configuring the blocking transistor QBLK to operate as an ideal diode at the input of the power converter (as opposed to circuitry at its output), the system 100 can better protect the input power supply from boost-back current than many existing approaches. This protection is implemented by the regulator quickly turning off the blocking transistor in response to detecting boost-back condition. Additionally, the voltage VBUS at the input bus voltage node 104 and the voltage PMID at the input power node 108 can each be discharged quickly to facilitate reducing undesired effects of boos-back.

Figure 2:
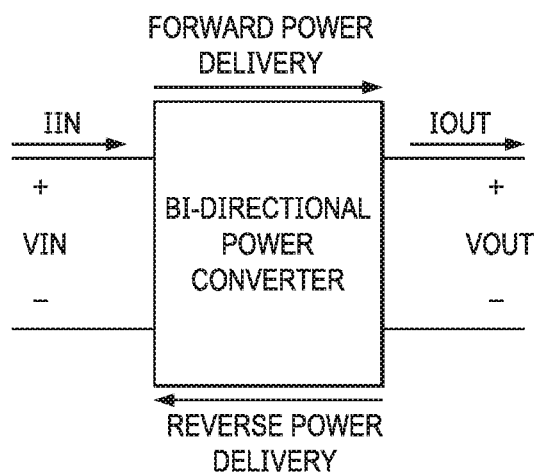
FIG. 2 is a diagram of a bi-directional power converter.

FIG. 2 illustrates a block diagram of a bi-directional power converter designed to convert a voltage at an input to provide an output voltage at an output (e.g., forward power delivery) as well as to implement power conversion and delivery from the output to an input (e.g., reverse power delivery). Due to the design of bi-directional power converters, there is no undesired power delivery. Bi-directional power converters include circuitry and control circuits that are configured to provide the power conversion and delivery in both directions. As such, bi-directional power converters are more complex, expensive, and larger than unidirectional power converters.

Figure 3:
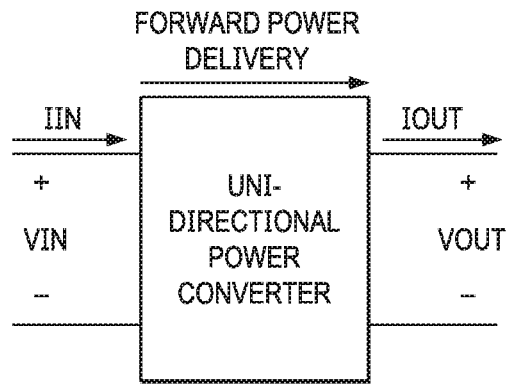
FIG. 3 is a diagram of a unidirectional power converter.

FIG. 3 illustrates a block diagram of a unidirectional power converter designed to provide power delivery in one direction, namely, from an input to an output (e.g., forward power delivery). Any power delivery from the output to the input (e.g., reverse power delivery) in a unidirectional power converter is undesired. Undesired power delivery, such as boost-back current, may cause damage to circuitry at the input and/or the output of the power converter or to the power converter itself.

Figure 4:
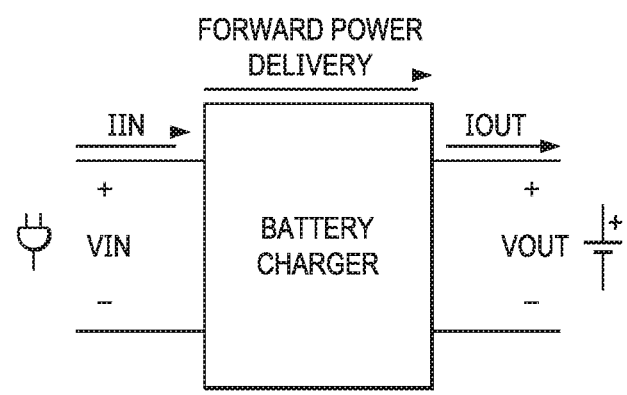
FIG. 4 is a diagram is an example of a power converter for charging a battery.

FIG. 4 illustrates an example of the unidirectional power converter of FIG. 3 implemented as a battery charger. FIG. 4 thus shows an input power source (e.g., a power supply) and an output power device (e.g., a battery). Undesired power delivery (e.g., reverse power delivery) from the output power device, such as in response to the input power source being disconnected results in draining the output power device (e.g., the battery) as well as may cause damage to the power converter circuitry. In addition to the problems of a unidirectional power converter, the output power source does not fully charge when there is undesired power delivery.

Figure 5:
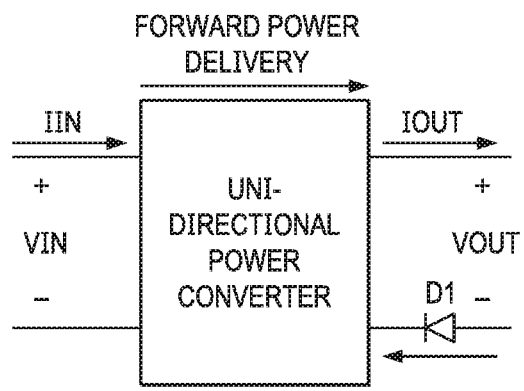
FIG. 5 is a diagram of an example of a typical system for charging a battery.

FIG. 5 illustrates an example of a unidirectional power converter that is configured to reduce reverse power delivery (e.g., boost-back conditions) by implementing a diode D1 at the output of the converter. The diode thus is configured to detect and block negative current from the output. However, such an approach typically has increased design complexity, increased device cost, and reduced device performance. Monitoring for undesired power delivery at the output of the unidirectional power converter has an increased design complexity, device cost, and/or reduced performance. For example, by including a diode at the output, such as demonstrated in FIG. 5, the power converter may enter a discontinuous conduction mode. Accordingly, the various regulation control loops need to be able to compensate and for this (e.g., by implementing pulse frequency modulation) and other undesired conditions. The additional circuitry and DCM that are utilized tends to reduce bandwidth as well as results in increased ripple at the output.

Figure 6:
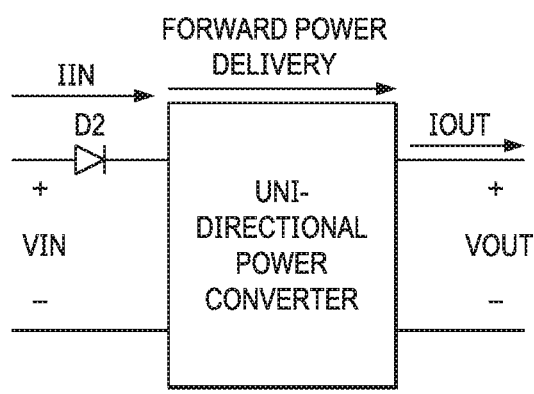
FIG. 6 is a diagram of a unidirectional power converter that includes boost-back protection.

FIG. 6 illustrates a block diagram of an example of a unidirectional power converter that is configured to reduce undesired reverse power delivery by implementing a diode D2 at the input rather than the output as in FIG. 5. For example, the unidirectional power converter 600 includes a diode D2 coupled between the input voltage source VIN and the unidirectional power converter to block boost-back conditions. By monitoring for undesired power delivery at the input, the complexity and/or device cost can be reduced and can exhibit improved performance over the approach in FIG. 5. For example, by monitoring at the input of the unidirectional power converter also allows a system (e.g., system 100 of FIG. 1) to monitor if the input power supply (e.g., power supply 102 of FIG. 1) is removed. Additionally, monitoring at the input of the unidirectional power converter allows the system to more quickly turn off the power converter if boost-back conditions are detected. For example, ripple at the output is reduced. In practice, however, the diode exhibits a voltage drop that reduces the overall efficiency of the power converter.

Figure 7:
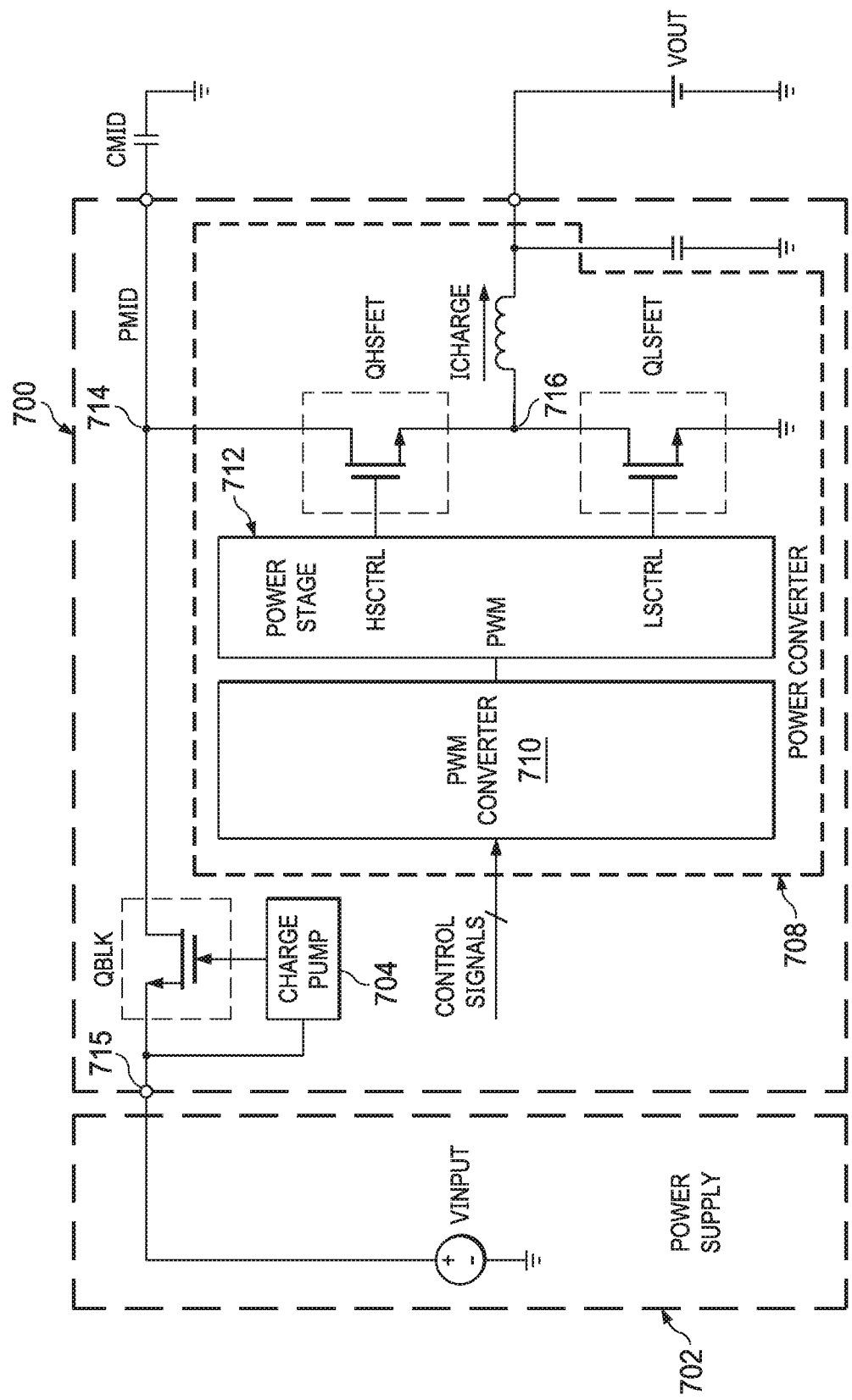
FIG. 7 is a block diagram of a typical power converter with a means of preventing boost back at the output.

FIG. 7 illustrates an example of a block diagram a unidirectional power converter system 700 according to the approach of FIG. 6 that includes a blocking transistor QBLK at the input to reduce reverse power delivery (e.g., boost-back conditions) through a power converter 708. The system 700 includes a power supply 702 that provides an input voltage VINPUT to an input node (e.g., a source) 715 of the blocking transistor QBLK. The power converter 708 is configured to convert the input voltage VINPUT into a corresponding output voltage according to the converter topology. The power converter 708 further provides a charge current ICHARGE at an output power node 716. The blocking transistor QBLK may be implemented as a MOSFET, a bi-polar junction transistor or other type of transistor device. In this example, a charge pump 704 is powered by the supply voltage VINPUT to drive a control node (e.g., a gate) of the blocking transistor QBLK. An output node (e.g., a drain) of the blocking transistor QBLK supplies a converter input voltage PMID at an input power node 714 to the power converter 708. The power converter 708 includes a pulse wave modulator (PWM) converter 710 configured to provide PWM signals to a power stage 712. The PWM control signal is based on CONTROL SIGNALS for one or more regulation loops. For example, the regulation loops monitor the temperature of the system 700, the input voltage VINPUT, a voltage output, an input current, and an output current.

The power stage 712 is configured to provide a high-side drive signal, HSCTRL to a high-side transistor QHSFET and a low-side drive signal LSCTRL to a low-side transistor QLSFET. The high-side drive signal HSCTRL and the low-side control signal LSCTRL are complementary signals such that when the high-side control signal HSCTRL has a value of logical 1, the low-side drive signal LSCTRL has a value of logical 0 and when the high-side drive signal HSCTRL has a value of logical 0, the low-side drive signal LSCTRL has a value of logical 1. In a charging mode, the high-side transistor QHSFET is turned on (e.g., operating in saturation) in response to the high-side drive signal HSCTRL having high voltage (e.g., logical 1), while the low-side transistor QLSFET is turned off (e.g., operating in cut-off) in response to the low-side drive signal LSCTRL provided as a low voltage (e.g., logical 0). In a non-charging mode, the high-side transistor QHSFET is turned off (e.g., operating in cut-off) in response to the high-side drive signal HSCTRL having a logical 0, while the low-side transistor QLSFET is turned on (e.g., operating in saturation) in response to the low-side control signal LSCTRL having logical 1.

The system 700 prevents reverse power delivery in a unidirectional power converter. However, the system 700 exhibits reduced performance because of the voltage drop across the blocking transistor QBLK. Additionally, the system is cannot respond quickly to boost-back conditions due to the passive controls of the blocking transistor QBLK. Instead, the blocking transistor QBLK turns off (e.g., operating in a cut-off region) only after the input voltage VINPUT is removed or drops sufficiently below the gate voltage provided by the charge pump. The system 700 also tends to be sensitive to the operation of the regulation loops that provide the CONTROL SIGNALS to the power converter 710.

Figure 8:
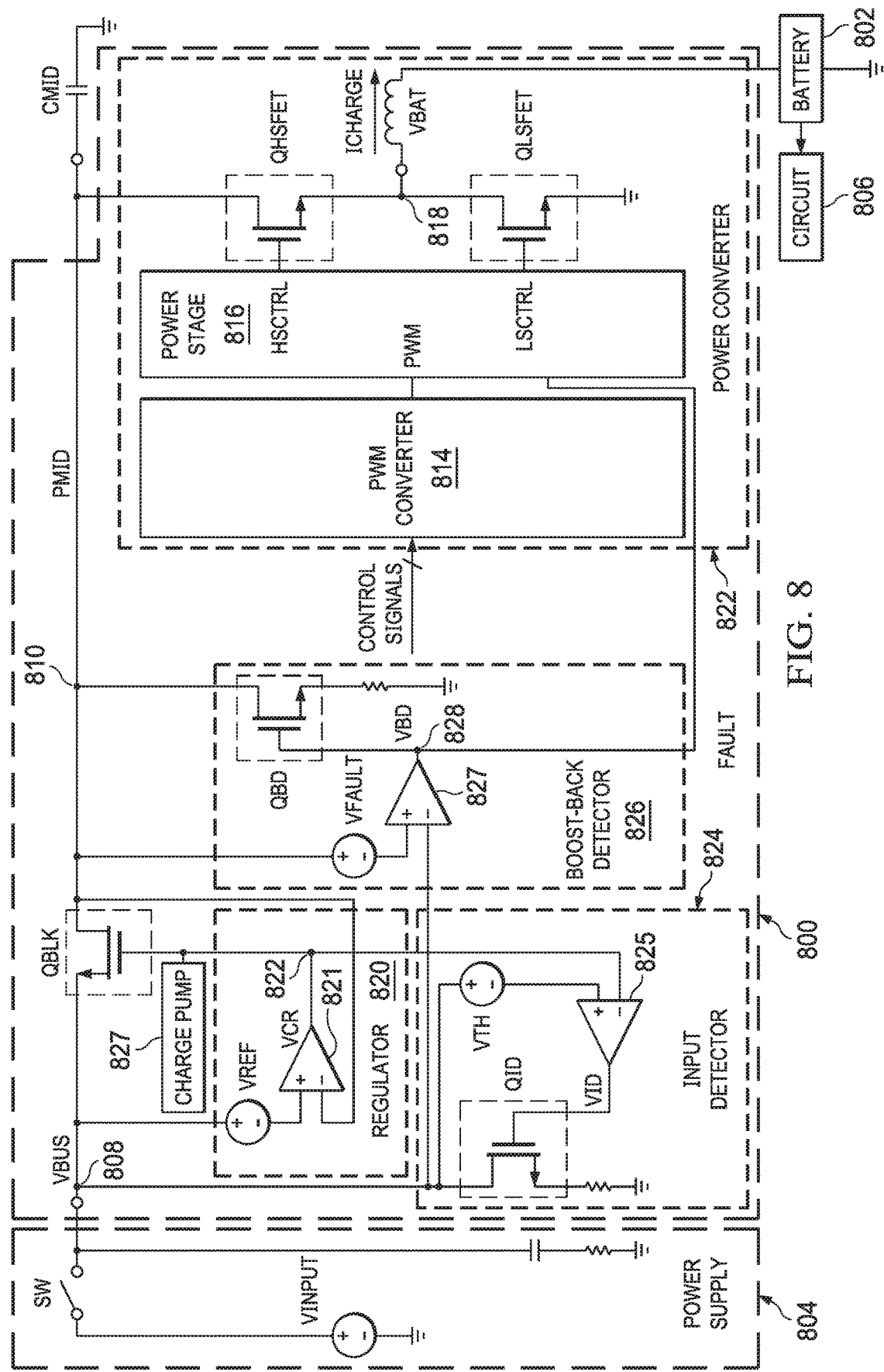
FIG. 8 is a diagram of another example of a power converter system for charging a battery that includes boost-back protection.

FIG. 8 illustrates an example of a power converter system 800 that is configured to reduce boost-back conditions. In the example of FIG. 8, the system is demonstrated for charging a battery 802 that is connected to an output, such as corresponding to the system 100 of FIG. 1. The system 800 addresses the issues present in the system 700 of FIG. 7. The system 800 is implemented, in some examples, as an IC chip, or a plurality of IC chips mounted on a circuit board with associated circuitry. As one example, the system 800 is implemented on a portable electronic device, such as a smart phone, a notebook or laptop computer, an IoT device, etc.

The system 800 includes a power supply 804 (e.g., power supply 102 of FIG. 1) that is configured to supply power to a voltage node (e.g., a voltage rail or bus) 808. The power supply 804 thus supplies an input voltage VINPUT to the node 808. The node 808 is representative of an input voltage rail that can supply power to various circuitry, including that demonstrated with respect to the system 800. In some examples, the battery 802 is configured to provide power to an external circuit 806.

The node 808 is coupled to a terminal of a blocking transistor QBLK (e.g. corresponding to the blocking transistor 106 of FIG. 1). The blocking transistor QBLK may be implemented as a MOSFET, a bi-polar junction transistor or other transistor device. In the example of FIG. 8, the blocking transistor QBLK is an NMOS and the node 808 is coupled to a source (e.g., input node) of the blocking transistor QBLK. A drain (e.g., output node) of the blocking transistor QBLK is coupled to an input node 810 of a power converter 812, and the voltage at the node 810 is referred to as converter input voltage (PMID).

In an example, the regulator 820 includes an amplifier 821 (e.g., an op-amp) having an inverting input coupled to PMID node 810. A voltage source is coupled between the node 808 and a non-inverting input of the amplifier 821. The voltage source is configured to provide a reference voltage (VREF) used for regulating the voltage drop across the blocking transistor QBLK. As an example, the reference voltage VREF is set to a low voltage (e.g., reference voltage may be less than 100 mV, such as about 20 mV or 4 mV). An output of the amplifier 821 is coupled to a gate of the blocking transistor to control its operation, as described herein, including its regulation and blocking modes. Thus, in addition to regulating the drop across the blocking transistor QBLK, the regulator 820 is also configured to turn off the blocking transistor QBLK in response to the voltage PMID exceeding the voltage VINPUT at the second node (e.g., by at least a threshold) to block boost-back current flowing from the output terminal to the second node.

As a further example, a charge pump 823 is also coupled to the control node (e.g., a gate) of the blocking transistor QBLK. The charge pump 823 is configured to drive the blocking transistor QBLK to facilitate its operation, including during regulation as well as when being turned off for blocking. The voltage regulator 820 and charge pump 823 thus are configured to cooperate and control operation of the blocking transistor QBLK to operate as an ideal diode having very little voltage drop across it as determined by the reference voltage and fast operation to turn off and block current (e.g., from PMID to VINPUT). For example, as mentioned, the voltage drop can be regulated to a voltage that is much less than a typical diode drop, such as to a voltage that is less than 100 mV (e.g., about 20 mV or 4 mV or even less).

The power converter 812 (e.g., corresponding to power converter 110 of FIG. 1) is configured to provide a charge current ICHARGE and output voltage VBAT at an output power node 818, which can be applied to charge the battery 802 during a charging mode. For example, the power converter is implemented as a buck mode power converter configured to operate in a forced continuous conduction mode.

As an example, the power converter 812 includes a pulse width modulation (PWM) generator 814 configured to provide a PWM signal to a power stage 816 in response to one or more CONTROL SIGNALS. The power stage 816 is configured to apply a high-side control signal HSCTRL to a high-side transistor QHSFET and to apply a low-side control signal LSCTRL to a low-side transistor QLSFET based on the PWM signal. The power stage 816 may provide the high-side control signal HSCTRL and the low-side control signal LSCTRL as complementary drive signals, such that when one control signal asserts a logical 1, the other control signal asserts a logical 0. The CONTROL SIGNALS may provided from external sources and/or sensors that are input into the PWM generator 814, such as corresponding to respective regulation loops. For example, the CONTROL SIGNALS include a temperature of the battery charger, a temperature of the battery 802, a state of charge of the battery 802. The state of charge of the battery 802 may be based on the input and/or output current and voltage of the battery 802. In some examples, the power converter 812 operates in the non-charging mode if the battery 802 is fully charged to prevent excess charging. In other examples, the power converter 812 operates in the non-charging mode in response to detecting that the system 800 and/or the battery 802 exceeds a temperature threshold. In yet another example, the power stage 816 is configured to operate in the non-charging mode in response to receiving a FAULT signal from the boost-back detector 826.

As a further example, the power stage applies the high-side control signal HSCTRL to a control node (e.g., a gate) of the high-side transistor QHSFET and applies the low-side control signal LSCTRL to a control node (e.g., a gate) of a low-side transistor QLSFET. The high-side transistor QHSFET and low-side transistor QLSFET may be implemented as MOSFET or a bipolar junction transistor. In the example of FIG. 8, NMOS devices are employed. An input node (e.g., a drain) of the high-side transistor QHSFET is coupled to the input power node 810 and an output node (e.g., a source) of the high-side transistor QHSFET is coupled to an output power node 818. The input node (e.g., a drain) of the low-side transistor QLSFET is coupled to the output power node 818 and an output node (e.g., a source) of the low-side transistor, QLSFET is coupled to a neutral node (e.g., electrical ground). Each of the QHSFET and QLSFET is configured to turn on when the corresponding control signal is a logical 1 and to turn off when the corresponding control signal is a logical 0. The power stage 816 is configured to apply the high-side control signal HSCTRL and the low-side control signal LSCTRL based on the CONTROL SIGNALS applied to the PWM generator 814 812.

The power converter 812 is configured to operate in the charging mode when the high-side transistor QHSFET is turned on and the low-side transistor, QLSFET is turned off, such that the charge current ICHARGE is applied to the battery 802 to provide the corresponding battery voltage VBAT. The power converter 812 may further configured to operate in the non-charging or discharge mode when the high-side transistor QHSFET is turned off and the low-side transistor QLSFET is turned on or operating in a triode region. In the discharge mode, the charge current ICHARGE and the output voltage VBAT at the output power node 818 may be discharged to the neutral node coupled to the output node of the low-side transistor QLSFET.

The regulator is also configured to provide the regulator output voltage VCR to an input detector 824 (e.g., corresponding to the input detector 116 of FIG. 1). The input detector 824 has inputs coupled to the control node 822 and the node 808 corresponding to the voltage VBUS. The input detector 824 is configured to sink current from the node 808 in response to detecting that the blocking transistor is turned off based on the voltages at VBUS and the control node 822.

As an example, the input detector 824 includes a switch device QID coupled between the node 808 and a neutral node (e.g., electrical ground), such as may be connected in series with a resistor to dissipate current during discharge. The switch device may be implemented as a transistor device, such as a MOSFET (e.g., NMOS or PMOS) or bipolar junction transistor. A comparator 825 has a first input coupled to the control node 822 of the blocking transistor QBLK and an output coupled a control input (e.g., gate) of the switch device QID. A voltage source VTH is coupled between the node 808 (e.g., drain of QID) and a second input of the comparator. The voltage source VTH is configured to apply a threshold voltage at the second input of the comparator. The comparator configured to control the switch device QID based on a comparison of the voltage at the node 808 relative to the voltage VCR at the control node 822. For example, the comparator 825 is configured to activate (e.g., turn on) the switch device QID and discharge the VBUS node 808 in response to the voltage VCR at the control node 822 of blocking transistor QBLK falling below the voltage at the second node by at least the threshold voltage VTH, such as may occur during boost-back condition including when the power supply 804 is disconnected from the VBUS node 808. The power supply 804 may be disconnected by opening the switch SW or otherwise (e.g., having a plug removed from an AC outlet).

The boost-back detector 826 (e.g., corresponding to unregulated boost-back detector 118 of FIG. 1) is configured to configured to generate a FAULT signal based on the voltage PMID and the voltage VBUS indicating an unregulated boost-back condition. The boost-back detector 826 has inputs coupled to the PMID node 810 to receive the voltage PMID and the node 808 to receive the voltage VBUS. The boost-back detector 826 is configured to provide a fault signal to turn off the power converter in response to the voltage at the PMID node 810 exceeding the voltage at the VBUS node 808 by a fault threshold (VFAULT).

In the example of FIG. 8, the boost-back detector 826 includes a comparator 827 having a first input (e.g., non-inverting input) coupled to the node corresponding to voltage PMID. An output of the comparator 827 is coupled to provide a boost-back detector voltage VBD to a control input of a switch device QBD and to a fault input of the power converter 812. The boost-back detector voltage VBD at node 828 also corresponds to a FAULT signal. The switch device QBD is coupled between the PMID node 810 and a neutral node (e.g., electrical ground). For example, the switch device QBD is a transistor device, such as a MOSFET (e.g., NMOS or PMOS), bipolar junction transistor or other type of transistor device. In the example of FIG. 8, a voltage source is coupled between the VBUS node 808 and a second input (e.g., inverting input) of the comparator 827. The voltage source configured to apply a fault threshold voltage at the second input to provide the boost-back detector voltage VBD at node 828 to control the switch device QBD based on comparing the voltage VBUS and PMID with respect to the fault threshold voltage. The boost-back detector voltage is applied to a control node (e.g., a gate) of the transistor device QBD. For example, the comparator 827 is configured to provide the FAULT signal at node 828 activate the switch device QBD and discharge the first node in response to voltage at the PMID node 810 exceeding the voltage at the VBUS node 808 by at least the fault threshold voltage.

As a further example, the switch device QBD is an NMOS having a drain coupled to the VBUS node 808 and a source coupled to a neutral node (e.g., electrical ground). The output of the comparator 827 is coupled to the gate of the QBD. The boost-back detector 826 is configured to turn on the transistor QBD in response to the bus voltage VBUS at 808 exceeding the PMID voltage at 810 by at least the fault threshold voltage VFAULT by applying the boost-back detector voltage VBD (e.g., FAULT signal) to the gate of the transistor QBD. In response to turning on the transistor QBD, the PMID voltage at 808 PMID at the input power node 810 is discharged to the neutral node (e.g., electrical ground). The boost-back detector voltage VBD is also applied to the power stage 816 of the power converter 812 as a FAULT signal. The FAULT signal is operative to place the power stage 816 of the power converter 812 in an off state (e.g., no longer providing ICHARGE to battery 802) during the detected boost-back condition.

In view of the foregoing, the system 800 of FIG. 8 is configured to overcome the issues of several power systems, such as the system 700 of FIG. 7. In particular, the system 800 provides improved boost-back protection by implementing an increased control (e.g., by regulator 820) over the blocking transistor QBLK. For example, the regulator 820 controls the blocking transistor QBLK to operate as an ideal diode at the input of the power converter 812, having very low voltage drop (e.g., less than 100 mV, such as 4 mV) and fast turn off when boost-back occurs. Additionally, as disclosed herein, the system 800 enables the bus voltage VBUS to be discharged (e.g., through input detector 824) and the converter input voltage PMID to be discharged (e.g., through boost-back detector 826). Moreover, the system 800 also generates a FAULT signal (e.g., by boost-back detector 826) to the power stage 816 of the power converter 812 in response to detecting the converter input voltage PMID exceeding the bus voltage VBUS by a threshold voltage.

Figure 9:
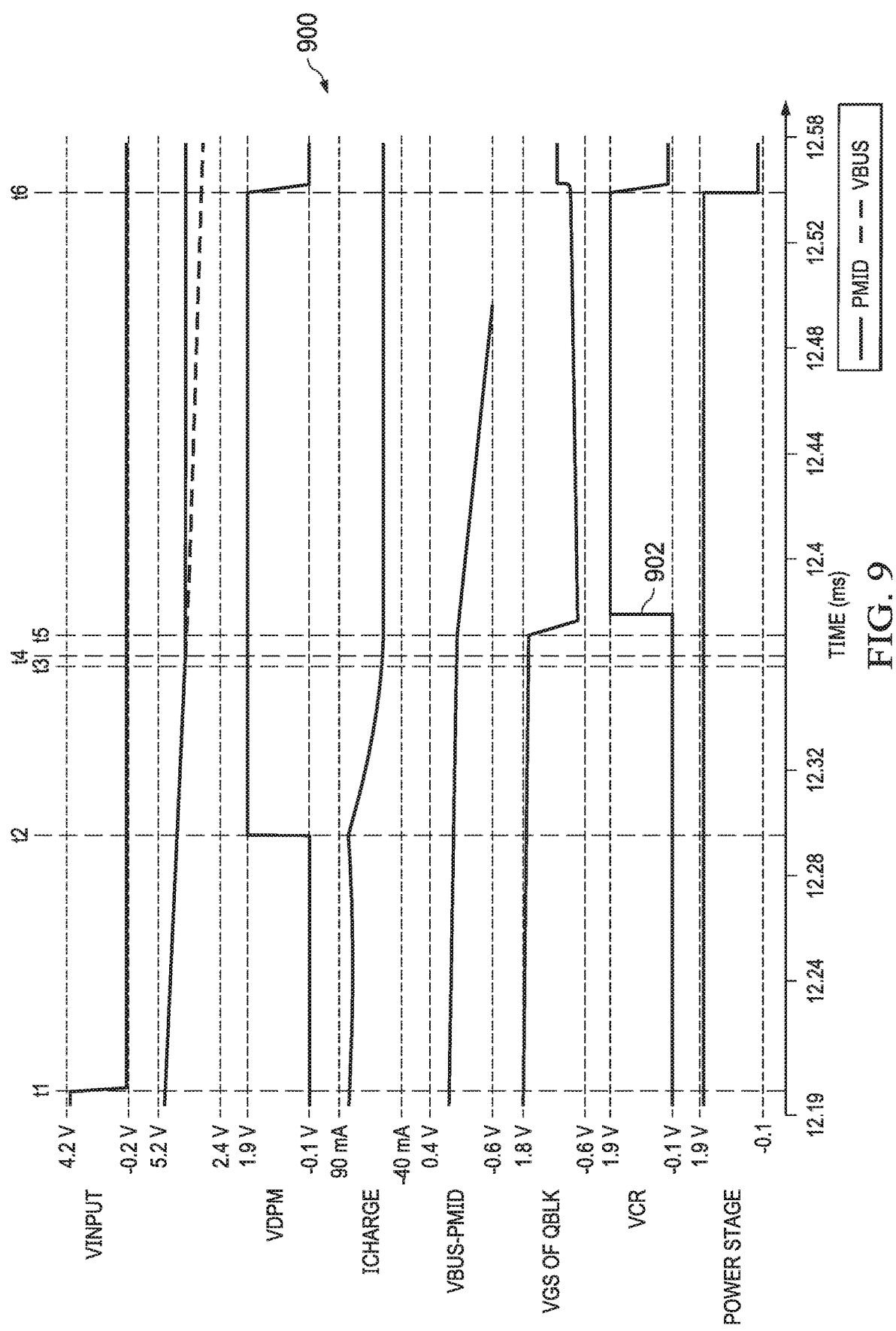
FIG. 9 is a graph that plots signals of the system of FIG. 8 as a function of time.
Figure 10:
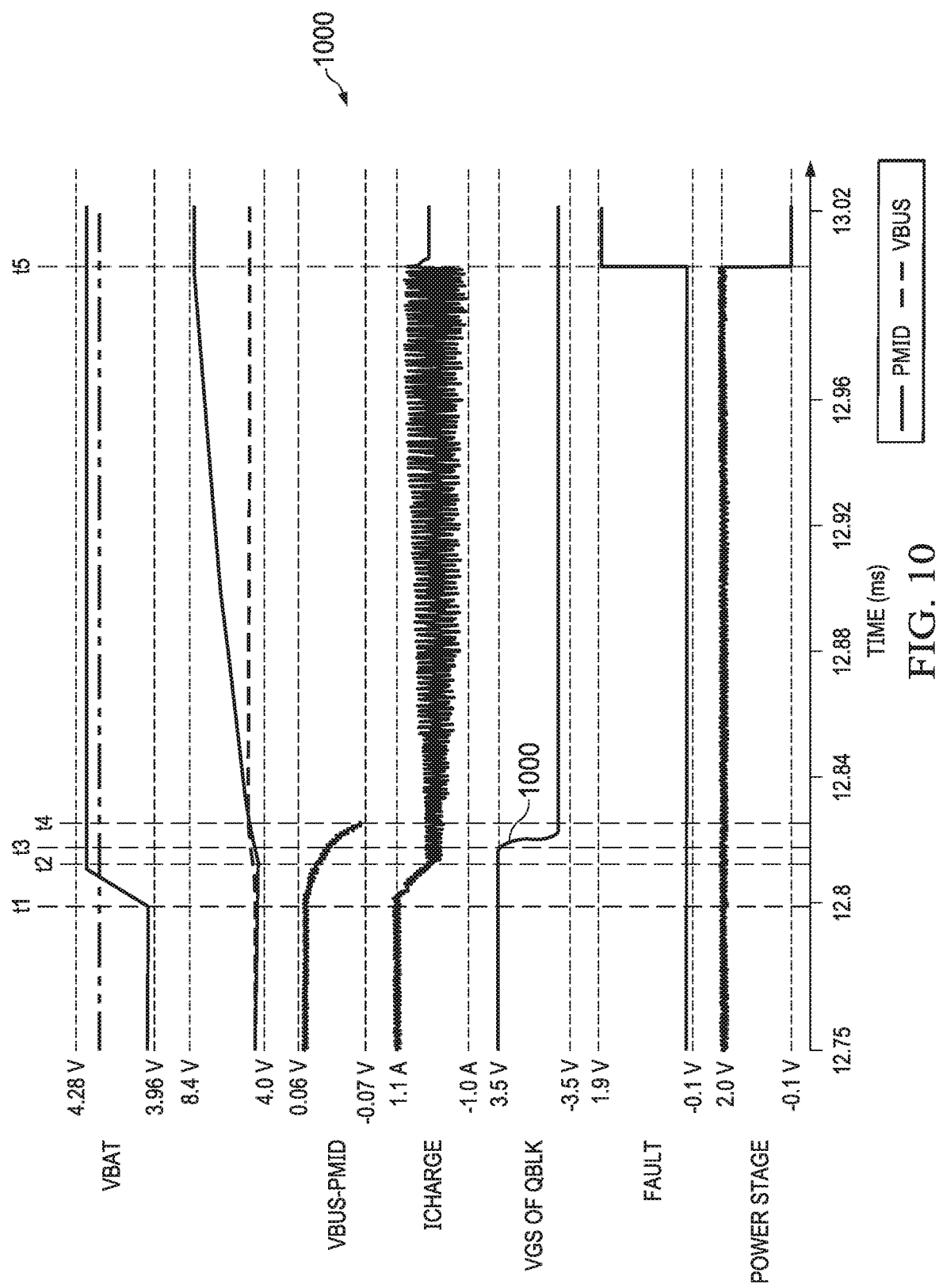
FIG. 10 is a graph that plots signals for detecting an unregulated boost-back condition as a function of time.

As illustrated in FIGS. 9 and 10, the system 800 exhibits increased stability of the charge current ICHARGE (e.g., decreased ripple) and a reduced converter input voltage PMID once the input voltage VINPUT is removed. FIG. 9 illustrates a transient analysis of a power converter system, such as the system 800 of FIG. 8. More particularly, FIG. 9 depicts a graph 900 that illustrates various waveforms from the system 800 as a function of time for an example when the power supply (e.g., power supply 804 of FIG. 8) is disconnected from the unidirectional power converter while power is being supplied to an output (e.g., battery 802 of FIG. 8). For example, the power supply may be disconnected in response to opening switch SW or an adapter being unplugged from an AC outlet.

FIG. 9 illustrates removing the input voltage VINPUT at time t1. The converter input voltage PMID and the bus voltage VBUS decrease (e.g., from about 4.2 V to about –0.2 V) as the power converter system continues to provide power to the output. The charge current ICHARGE decreases and increases between times t1 and t2 indicating reverse power delivery from the output (e.g., corresponding to a boost-back condition). In response to the reverse power delivery, the system begins to regulate the converter input voltage PMID starting at time t2 in which VDPM increases (e.g., from about –0.1 V to about 1.p V). Time t2 illustrates power at the output power node 818 of FIG. 8 starting to be discharged to a neutral node (e.g., a ground), as shown by decreasing of ICHARGE. Thus, by time t4 the charger current ICHARGE and the converter input voltage PMID are fully discharged. Additionally, the converter input voltage PMID thus decreases from time t1 to time t2 and eventually stabilizes (e.g., to about 4 V) at time t3. At time t5, the blocking transistor QBLK of FIG. 8 is turned off by the regulator 820 based on the VGS of QBLK. A time t5, the transistor QID of the input detector 824 is also turned on such that the voltage VBUS at the node 808 is discharged to a neutral node (e.g., a ground) through a resistor. In response to the VGS of QBLK being pulled low, the comparator 821 goes high (demonstrated at 902). At time t6, the power stage 816 of FIG. 8 is turned off (e.g., in response to FAULT signal provided by boost-back detector 826 and stops providing power to the output. Thus at time t6, the output 822 of comparator 821 goes low as does the VDPM and the output of the power stage at 818. In the illustrated example, the time between time t1 and time t6 is approximately 0.34 ms.

FIG. 10 is a graph 1000 illustrates an example of waveforms for a typical power converter system when the input power supply is removed in an example system (e.g., the system 700 in FIG. 7) that does not implement boost-back protection, as disclosed herein. In FIG. 10, the battery voltage, VBAT increases at time t1 in response to the unregulated boost-back and exceeds a battery regulation voltage. The charge current ICHARGE decreases between times t1 and t2. At time t2, oscillations of the charge current ICHARGE begins to increase until there is a current swing of approximately 2 A, at time t5, when the power converter system is turned off. At time t2, the converter input voltage PMID also begins to increase as the system attempts to charge the battery. The potential difference VBUS-PMID also decreases from time t1 until PMID increases above VBUS at time t4. A blocking transistor (e.g., the blocking transistor QBLK of FIG. 5 or 7) is turned off at time t3 in response to the VGS of QBLK going low demonstrated at 1002. However, in the example of FIG. 10 (in contrast to FIG. 9), the charge current ICHARGE continues to oscillate even after the blocking transistor is turned off due to the converter input voltage PMID increasing from approximately 4 V (at time t2) to approximately 8.4 V when the power converter system is turned off (at time t6). Once the power converter system is turned off, the converter input voltage PMID remains in the power converter system. At time t5 a fault signal FAULT is applied to turn the power stage off to stop the power converter system from attempting to charge the output of the power converter system. The power converter system illustrated in FIG. 10 takes approximately 0.2 ms to turn off. Exceeding the battery regulation voltage, oscillation of the charge current, ICHARGE, and an uncontrolled increase in the converter input voltage, PMID causes damage through overheating and excess voltage in the power converter system and/or the battery.

By way of comparison, the operation of the power converter system demonstrated in FIG. 9 provides a charge current ICHARGE and power stage output that has minimal amplitude oscillation compared to the typical power converter system illustrated in FIG. 10. The waveforms demonstrated in FIG. 9 also demonstrate the converter input voltage PMID discharging when the input voltage VINPUT is removed rather than increasing until the power stage is turned off (e.g., not converting) and retaining the voltage as in the approach demonstrated in FIG. 10. Thus, as disclosed herein system of FIGS. 1 and 8 thus exhibits improved performance over typical systems.

Figure 11:
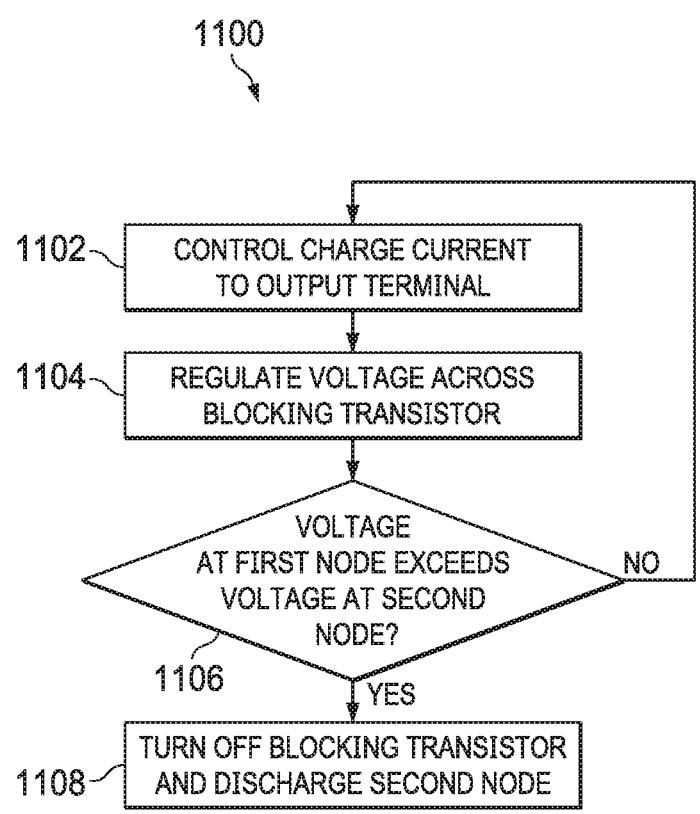
FIG. 11 is a flow diagram depicting an example method for providing boost-back protection.

FIG. 11 is a flow diagram illustrating an example method 1100 for protecting a power converter (e.g., a unidirectional buck power converter). The method 1100 is described with respect to the system 800 of FIG. 8 and reference may be made back to FIG. 8 for additional context.

At step 1102, the method includes controlling a charge current (e.g., ICHARGE) to an output terminal (e.g., corresponding to node 818) that is adapted to couple to a battery (e.g., battery 802) based on a voltage at a first node (e.g., PMID node 810) and control signals. For example, the PWM converter 814 and power stage 816 control QHSFET and QLSFET to provide the charge current ICHARGE. At step 1104, a voltage across a blocking transistor (e.g., QBLK) is regulated. The blocking transistor QBLK is coupled between a second node (e.g., VBUS node 808) and the first node (e.g., PMID node 810). For example, the regulator 820 is configured to regulate the voltage potential across QBLK based on voltages VBUS and PMID. The voltage regulation (e.g., by regulator 820) across QBLK thus is operative to set the voltage at the PMID node 810 based on a voltage at the VBUS node 808. At step 1106, the voltages at the first and second nodes are detected, and a determination is made whether the voltage at first node exceeds the voltage at the second node by a threshold. For example, regulator is configured to compare the voltages at the VBUS node 808 and PMID node 810 with respect to the threshold VREF. At step 1108, in response to detecting the voltage at the first node exceeds the voltage at the second node by the threshold, the blocking transistor is turned off. For example, the regulator 820 is configured to turn off the blocking transistor QBLK when the voltage at the PMID node 810 exceeds the voltage at the VBUS node 808. Additionally, at step 1108, the second node is discharged. For example, the input detector 824 is configured to discharge the voltage VBUS at the node 808 based on the voltage at the gate of QBLK and the voltage at the VBUS node (e.g., the gate-to-source voltage). If the determination at step 1106 is negative, indicating that no boost-back condition exists, the method returns to step 1102 to repeat the actions at 1102 and 1104.

In some examples, the method 1100 may further include generating a fault signal (e.g., by boost-back detector 826) in response to detecting an unregulated boost-back condition of the blocking transistor QBLK based on the voltage at the first node relative to the voltage at the second node. For example, boost-back detector 826 is configured to compare the voltages at the VBUS node 808 and PMID node 810 with respect to the threshold VFAULT and to provide the FAULT signal in response to detecting an unregulated boost-back condition. For example, the unregulated boost back condition may be detected by boost-back detector 826 when the voltage (PMID) exceeds the bus voltage VBUS by at least a fault threshold (VFAULT), as disclosed herein. In response to generating the fault signal, the charge current may be disable (e.g., by turning off the power stage of power converter) and/or the first node may be discharged (e.g., by activating switch of boost-back detector 826).

As another example, the blocking transistor QBLK is implemented as a MOSFET device (e.g., an NMOS). The voltage regulation across the blocking transistor QBLK may thus include regulating a drain-to-source voltage across the blocking transistor based on a reference voltage (e.g., voltage VREF), such that the blocking transistor is configured to operate as an ideal diode based on the voltage at the VBUS node 808 and the voltage at the PMID node 810.

In this description, the term "based on" means based at least in part on. Modifications are possible in the described embodiments, and other embodiments are possible, within the scope of the claims.

What is claimed is:

1. A device comprising:
 a power converter having an input coupled to a first node and an output coupled to an output terminal adapted to couple to a battery;
 a blocking transistor coupled between a second node and the first node along a path between the second node and the output terminal; and
 a regulator having inputs coupled to the first node and the second node and an output coupled to a control node of the blocking transistor, the regulator configured to control the blocking transistor to regulate a voltage across the blocking transistor based on a voltage between the first node and the second node, the regulator also configured to turn off the blocking transistor in response to a first voltage at the first node exceeding a second voltage at the second node by a threshold amount to block boost-back current flowing from the output terminal to the second node along the path.

2. The device of claim 1, wherein the blocking transistor comprises a field effect transistor having a drain coupled to the first node and a source coupled to the second node, the regulator being configured to regulate a voltage drop from the source to the drain based on a reference voltage such that the blocking transistor is configured to operate as an ideal diode.

3. The device of claim 2, wherein the regulator further comprises:
 an amplifier having an inverting input coupled to the first node and an output coupled to a gate of the blocking transistor; and
 a voltage source coupled between the second node and a non-inverting input of the amplifier, the voltage source configured to provide the reference voltage.

4. The device of claim 1, further comprising an input detector having inputs coupled to the control node and the second node, the input detector configured to sink current from the second node in response to detecting that the blocking transistor is turned off.

5. The device of claim 4, wherein the input detector comprises:
 a switch device coupled between the second node and a neutral node;
 a comparator having a first input coupled to the control node of the blocking transistor and an output coupled to a control input of the switch device; and
 a voltage source coupled between the second node and a second input of the comparator, the voltage source configured to apply a threshold voltage at the second input, the comparator configured to activate the switch device and discharge the second node in response to a voltage at the control node of the blocking transistor falling below the voltage at the second node by at least the threshold voltage.

6. The device of claim 1, further comprising a boost-back detector having inputs coupled to the first node and the second node, the boost-back detector is configured to provide a fault signal to turn off the power converter in response to the voltage at the first node exceeding the voltage at the second node by a fault threshold.

7. The device of claim 6, wherein the boost-back detector comprises:
 a switch device coupled between the first node and a neutral node;
 a comparator having a first input coupled to the first node, an output of the comparator coupled to a control input of the switch device and to a fault input of the power converter; and
 a voltage source coupled between the second node and a second input of the comparator, the voltage source configured to apply a fault threshold voltage at the second input such that the comparator is configured to activate the switch device and discharge the first node in response to voltage at the first node exceeding the voltage at the first node by at least the fault threshold voltage.

8. The device of claim 1, wherein the power converter is configured as a buck mode power converter configured to operate in a forced continuous conduction mode.

9. The device of claim 1, wherein the power converter comprises:
a pulse width modulator configured to generate a pulse width modulated (PWM) signal with a duty cycle that varies as a function of one or more control signals;
a power stage converter configured to generate first and second drive signals based on the PWM signal;
a high-side transistor coupled between the first node and the output of the power converter, wherein a state of the high-side transistor is controlled based on the first drive signal; and
a low-side transistor coupled between the output of the power converter and a neutral node, wherein a state of the low-side transistor is controlled by the second drive signal, wherein the charge current flows to the output terminal to charge the battery.

10. The device of claim 1, further comprising a boost-back detector configured to provide a fault signal at a fault output in response to detecting an unregulated boost-back condition across the blocking transistor,
wherein the power converter includes a power stage having a fault input coupled to the fault output of the boost-back detector and is configured to turn off the power stage based on the fault signal.

11. A system comprising:
a power converter configured to provide a charge current to an output terminal in response to one or more control signals and based on a voltage at a first node;
a blocking transistor coupled between a second node and an input node of the power converter;
a regulator configured to regulate a voltage drop across the blocking transistor based on a voltage at the first node and a voltage at the second node and configured to turn off the blocking transistor in response to a voltage at the first node exceeding a voltage at the second node by a threshold, such that current from the output terminal to the second node is blocked by the blocking transistor;
an input detector configured to discharge the second node in response to the blocking transistor being turned off; and
a boost-back detector configured to turn off the power converter in response to detecting a boost-back condition of the blocking transistor.

12. The system of claim 11, wherein the blocking transistor comprises a field effect transistor having a drain coupled to the first node and a source coupled to the second node, the regulator being configured to regulate the voltage drop from the source to the drain based on a reference voltage such that the blocking transistor is configured to operate as an ideal diode based on the voltage at the second node and the voltage at the first node.

13. The system of claim 12, wherein the regulator further comprises:
an amplifier having an inverting input coupled to the first node and an output coupled to a gate of the blocking transistor; and a voltage source coupled between the second node and a non-inverting input of the amplifier, the voltage source configured to provide the reference voltage.

14. The system of claim 11, wherein the boost-back detector comprises:
a comparator configured to provide a fault signal in response to voltage at the first node exceeding the voltage at the first node by at least a fault threshold voltage, the power converter being further configured to turn off in response to the fault signal; and
a switch device coupled between the first node and a neutral node, the switch device configured to discharge the second node in response to the fault signal.

15. The system of claim 11, wherein the input detector comprises:
a switch device coupled between the second node and a neutral node;
a comparator configured to activate the switch device and discharge the second node in response to voltage at a control node of the blocking transistor falling below the voltage at the second node by at least a threshold voltage.

16. The system of claim 11, further comprising a power supply configured to supply the voltage at the second node.

17. The system of claim 11, further comprising a battery coupled to the output terminal, the power converter being configured to provide the charge current to charge the battery.

18. A method comprising:
controlling a charge current to an output terminal that is adapted to couple to a battery based on a voltage at a first node and in response to one or more control signals;
regulating a voltage across a blocking transistor, which is coupled between a second node and the first node, based on a reference voltage;
monitoring the voltage at the first node and the voltage at the second node, in response to the voltage at the first node exceeding the voltage at the second node by a threshold,
turning off the blocking transistor; and
discharging the second node.

19. The method of claim 18, further comprising:
generating a fault signal in response to detecting an unregulated boost-back condition of the blocking transistor based on the voltage at the first node relative to the voltage at the second node;
disabling a power converter in response to the fault signal; and
discharging the first node in response to the fault signal.

20. The method of claim 18, wherein the blocking transistor is field effect transistor and regulating the voltage across the blocking transistor further comprises regulating a source-to-drain voltage across the blocking transistor based on the reference voltage such that the blocking transistor is configured to operate as an ideal diode based on the voltage at the second node and the voltage at the first node.

* * * * *